Nov. 26, 1968   K. A. PAMER   3,412,688
COMPOUND BEAM-RAIL
Filed Feb. 20, 1967
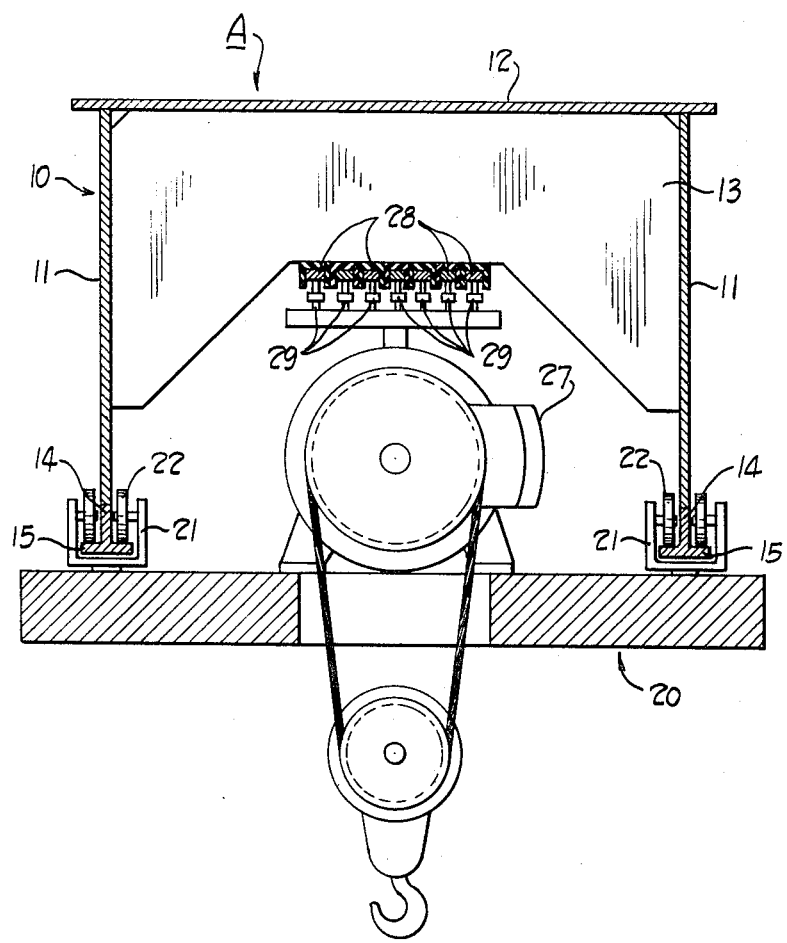
INVENTOR.
KARL A. PAMER
BY Watts, Hoffmann,
Fisher & Heinke
ATTORNEYS.

United States Patent Office 3,412,688
Patented Nov. 26, 1968

3,412,688
COMPOUND BEAM-RAIL
Karl A. Pamer, Chagrin Falls, Ohio, assignor to McNeil Corporation, Akron, Ohio, a corporation of Ohio
Filed Feb. 20, 1967, Ser. No. 617,199
Claims priority, application Luxembourg, Mar. 11, 1966, Patent 50,628
6 Claims. (Cl. 104—98)

ABSTRACT OF THE DISCLOSURE

A compound beam-rail for overhead, underslung traveling or movable carriers of a material handling apparatus, for example hoists, cranes and the like, in which can be housed associated electrical distribution systems and other mechanisms.

Background of the invention

This invention relates generally to power actuated, overhead material handling apparatus, and more specifically to a new compound beam-rail unit adapted to support an overhead, traveling underslung carrier.

A typical beam-rail for an overhead electrified material handling apparatus including an underslung carrier has been an inverted T-shaped rail welded to the flange of a T-beam. The electrical distribution system, including the conductor bars and the current collector assemblies, have been usually disposed adjacent the sides of the rail or rails exposed to damage, as by accidental contact by workmen and the like.

Summary of the invention

The new compound beam-rail of this invention is generally in the shape of an inverted U-shaped beam or channel or a box girder open at its bottom. The beam-rail has moving wheel supporting flanges along the lower edges of the sides or webs which serve as a support for a movable underslung carrier that may be a hoist, a traveling crane or a material carrier of a monorail system.

The preferred construction of the new beam-rail comprises a pair of plate-like web members connected to a top plate-like member and inverted T-shaped rails connected to the lower edges of the web members. This preferred construction can be economically produced and easily installed. Further, the construction is such that it can be produced in any desired size which is suited to the load and span conditions of a particular installation.

A particular feature of the invention is that the electrical distribution system can be housed and protected within the beam-rail. Conventional conductor bars extend lengthwise of the beam-rail between the webs and are thus protected against accidental contact by workmen and the like.

Description of the drawing

The drawing illustrates in vertical cross-section a preferred embodiment of the new compound beam-rail of this invention and schematically shows a typical carrier mounted for movement therealong.

Description of the preferred embodiment

Referring to the drawing, the beam part of the illustrated compound beam-rail A is generally designated by reference numeral 10. The beam 10 is comprised of side or web plates 11 which are welded to the underside of a top plate 12. The welded assembly of the web plates 11 and the top plate 12 has the general shape of an inverted U-shaped channel or box girder open at its bottom and may be of any suitable length. Depending upon the desired width of the beam 10, the load conditions and similar factors, the welded assembly of the web plates and top plate can be replaced by one or more formed commercial beams. The welded assembly is preferred, however, because it can be produced economically in unlimited sizes adaptable for the various span and load conditions encountered in erection of overhead track installations.

The beam 10 is reinforced along its length by a plurality of spaced ribs 13, only one of which is shown. Each of the ribs 13 extends transversely of the beam 10 and is welded to the inner surfaces of the web plates 11 and the top plate 12. The number and spacing of the ribs 13 can be varied depending upon the load requirements of the installation.

An inverted T-shaped rail member 14 is welded to the lower edge of each of the web plates 11. The members 11, 12 and 13 of the beam 10 may be commercial low-carbon steel plates, while the rail members 14 are preferably made of a material having good wearing qualities, such as high carbon steel or the like. The inverted T-shaped rails 14 provide moving wheel supporting flanges 15 which serve as a support for an underslung carrier 20.

The illustrated material handling apparatus includes an underslung carrier 20 having conventional wheel trucks 21 and wheels 22 which move along the upper surfaces of the rail flanges 15. As shown, the carrier 20 also comprises a hoist mechanism including a reversible electric motor 27. It will be understood that the carrier 20 can be powered by a reversible electric motor (not shown) and can be associated with a movable operator cab or cage (also not shown), as desired.

In accordance with this invention, the electrical distribution system is housed within the beam 10 of the beam-rail A. The illustrated electrical power and/or control system includes the usual insulated conductor bars 28 which extend lengthwise of the beam 10 and are secured to the undersurfaces of the ribs 13. Current collector members or shoes 29 supported by the carrier 20 slidably engage the conductor bars 28. A more complete description of a preferred current collector assembly is disclosed in U.S. Patent No. 2,700,705 issued Jan. 25, 1955, to Alphonse F. Anjeskey et al.

As will be apparent from the foregoing description, the invention provides a new compound beam-rail for overhead installations. The beam-rail can be efficiently and economically produced and can be easily installed. The new construction also affords a considerable savings in weight as distinguished from many prior art structures. A particular feature of the invention is that the electrical distribution system can be housed and protected within the beam of the beam-rail to prevent accidental contact and damage.

As disclosed herein, the new beam-rail may be installed as a support for a movable underslung carrier including a hoist mechanism. The new beam-rail also may serve as a support for a material carrier of a monorail system. In other installations the new beam-rail may serve as a crane bridge and may be provided with end trucks and wheels adapted to move along an overhead trackway formed by the flanges of similarly constructed, stationary beam-rails.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:
1. A compound beam-rail for supporting a traveling underslung carrier comprising parallel web plates arranged side-by-side but spaced from one another, a plate connecting said web plates adjacent two of their longi- tudinal edges, T-shaped rail members connected to the other longitudinal edges of said web plates.

2. A compound beam-rail as claimed in claim 1 including stiffening members secured to the inner surfaces of said plates.

3. In an overhead material handling system including a traveling underslung carrier having moving wheels, the improvement comprising a compound beam-rail for supporting said carrier, said beam-rail including a pair of parallel web plates arranged side-by-side and spaced from one another, a top plate connected to two longitudinal edges of said web plates to form an inverted U-shaped channel, and T-shaped rail members connected to the other longitudinal edges of said web plates to provide moving wheel supporting flanges.

4. A material handling system as claimed in claim 3 including an electrical distribution system housed within said beam-rail.

5. A material handling system as claimed in claim 4 wherein said electrical distribution system includes electric conductor bars which are connected to and extend lengthwise of said beam-rail.

6. A material handling system as claimed in claim 5 wherein said beam-rail includes rib members connected to the inner surfaces of said plates, said rib members being disposed in spaced locations along the length of said beam-rail; and wherein said conductor bars are connected to said rib members.

References Cited

UNITED STATES PATENTS

| 2,643,004 | 6/1953 | Wingenroth | 212—11 |
| 3,344,932 | 10/1967 | De Gasperis | 212—18 |

ARTHUR L. LA POINT, *Primary Examiner.*

D. F. WORTH, *Assistant Examiner.*